United States Patent
Zhang et al.

(10) Patent No.: US 11,769,165 B2
(45) Date of Patent: Sep. 26, 2023

(54) INTEGRATED EXPLICIT INTENT AND INFERENCE BASED JOB SEEKER IDENTIFICATION AND SEGMENTATION

(71) Applicant: Microsoft Technology Licensing, LLC, Redmond, WA (US)

(72) Inventors: Chunzhe Zhang, Sunnyvale, CA (US); Satej Milind Wagle, San Jose, CA (US); Linda Fayad, San Francisco, CA (US); Ada Cheuk Ying Yu, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/166,190

(22) Filed: Feb. 3, 2021

(65) Prior Publication Data
US 2022/0245659 A1 Aug. 4, 2022

(51) Int. Cl.
G06Q 30/0204 (2023.01)
G06N 3/08 (2023.01)
G06N 3/04 (2023.01)
G06Q 30/0201 (2023.01)

(52) U.S. Cl.
CPC ........... *G06Q 30/0204* (2013.01); *G06N 3/04* (2013.01); *G06N 3/08* (2013.01); *G06Q 30/0201* (2013.01)

(58) Field of Classification Search
CPC .. G06Q 30/0204; G06Q 30/0201; G06N 3/04; G06N 3/08
See application file for complete search history.

(56) References Cited

U.S. PATENT DOCUMENTS

| 8,655,695 B1* | 2/2014 | Qu ..................... G06Q 30/0251 705/7.29 |
| 2012/0041792 A1* | 2/2012 | Priyadarshan ..... G06Q 30/0251 705/5 |
| 2017/0308960 A1* | 10/2017 | Mascaro ................ G06Q 10/10 |

(Continued)

OTHER PUBLICATIONS

Roy et al., "A Machine Learning approach for Automation of Resume Recommendation system", Vellore Institute of Technology, Vellore, TN, India, International Conference on Computational Intelligence and Data Science (ICCIDS 2019), Procedia Computer Science 167 (2020) 2318-2327. (Year: 2020).*

(Continued)

*Primary Examiner* — Pan G Choy
(74) *Attorney, Agent, or Firm* — Schwegman, Lundberg & Woessner, P.A.

(57) ABSTRACT

In an example embodiment, a specialized machine learned model, called a look-alike model, is trained using a machine learning algorithm to predict future job engagement for a user. This look-alike model is then used to create new segments on top of the segments provided by a rules-based approach. Specifically, the look-alike model is designed to take users who have been segmented by a rule-based approach into an "inactive job seeker" categorization (such as those assigned to the resting users and dormant users segments) and calculate a predicted job engagement score for these users. Based on the predicted job engagement score, a user may then be reassigned from one of the inactive job seeker categorizations to one of one or more new job seeker categorizations (such as predicted open job seekers or predicted opportunistic job seekers).

19 Claims, 7 Drawing Sheets

(56) References Cited

U.S. PATENT DOCUMENTS

| | | | | |
|---|---|---|---|---|
| 2019/0228343 | A1* | 7/2019 | Gu | G06N 20/20 |
| 2020/0104395 | A1* | 4/2020 | Bhatia | G06N 3/08 |
| 2021/0073661 | A1* | 3/2021 | Matlick | H04L 61/5007 |

OTHER PUBLICATIONS

"Machine Learning Resume Job Matching Solution", by Prince Clement Addo and Xiaoyu Li, University of Electronic Science and Technology of China. ResearchGate, Jul. 2016. (Year: 2020).*

"A Deep-Learning Inspired Person Job Matching Model Based on Sentence Vectors and Subject-Term Graphs", by Wang et al., School of Mechanical and Electrical Engineering, Guangzhou University, Guangzhou 510006, China. Hindawi Complexity, vol. 2021, Article ID 6206288. Published Oct. 19, 2021. (Year: 2021).*

"Matching Job Applications to Free Text Job Ads Using Semantic Networks and Natural Language Interface", by Anton Thun, Schedule of Electrical Engineering and Computer Science, Jun. 26, 2020. (Year: 2020).*

"Machine Learning approach to match candidates with jobs applying semantic embeddings", by Luis Matos Pombo, NOVA Information Management School, Universidade Nova De Lisboa, 2019. (Year: 2019).*

* cited by examiner

INTEGRATED EXPLICIT INTENT AND INFERENCE BASED JOB SEEKER IDENTIFICATION AND SEGMENTATION

TECHNICAL FIELD

The present disclosure generally relates to technical problems encountered in machine learning. More specifically, the present disclosure relates to integrated explicit intent and inference based job seeker identification and segmentation in machine learning.

BACKGROUND

The rise of the Internet has occasioned two disparate yet related phenomena: the increase in the presence of online networks, with their corresponding user profiles visible to large numbers of people, and the increase in the use of these online networks for job services, including job services (on the candidate-side) and candidate searches (on the employer-side or recruiter-side). On the employer-side or recruiter-side, it can be beneficial to know whether a potential applicant for a job is an active job seeker because active job seekers are more likely to be responsive to communications from employers and recruiters, and hence are more likely to be worth the employer's or recruiter's time in researching and contacting.

Traditionally, systems would generate a job seeker score for users based on usage information. Specifically, a set of rules were established that generate the job seeker score based on how the users interacted with the online network(s). For example, the number of times the user has performed a job search or applied for a job on the online network in the last 90 days might be used as factors in such a rules-based determination of a job seeker score. The job seeker score itself would then be indicative of how active the user is in searching for a job.

The job seeker score may be used directly by employers and recruiters, such as by having a user interface that would display the job seeker score for a user being presented to the employer or recruiter, but some systems utilize the job seeker score in a more automated way. For example, some systems utilize machine learned models to rank users for presentation to recruiters or employers, as a list of potential candidates to contact. Such models may utilize the job seeker score as a feature of the machine learned models in order to factor in the likelihood of a user responding to a recruiter or employer in the determination of how high to rank the user for presentation to the recruiter or employer. Thus, the rules-based job seeker score is utilized as an input to machine learned ranking models.

Typically such rules-based systems would segment the users into segments based on their job seeker score. For example, there might be five segments: 1. Urgent Job Seekers (indicative of users who need a job), 2. Open Job Seekers (indicative of users who want a job but don't need a job), 3. Opportunistic Job Seekers (casual job seekers, indicative of users who would take the right job but don't necessarily want or need a new job, 4. Resting Users (users not looking for a job, but who still engage with the online network in other ways), and 5. Dormant Users (users who do not engage with the online network).

Such a rules-based approach to calculating a job seeker score is limited, however. It relies solely on actual usage data as a measure of job seeking intent, but this usage data may be inaccurate or incomplete. Classifying all users who perform job searches frequently as active users, for example, leads to inaccurate calculations of job seekers score, as some users who perform job searches frequently are not actually actively looking for jobs. Likewise, classifying all users who perform job searches infrequently as inactive users, for example, leads to inaccurate calculations of job seeker scores, as some users who perform job searches infrequently are actually actively looking for jobs, but simply do not perform frequent searches either because they are too busy, or perhaps the jobs they are interested in are niche jobs and they know that openings do not appear that often. Thus, by misclassifying users into incorrect segments, the rules-based approach provides inaccurate calculations.

There is also a distinction between job seeker intent and job seeker future engagement. While there is much overlap between the two, they are not identical. Job seeker intent is an indication of how much a user desires/needs a new job, while job seeker future engagement is an indication of how likely a user is to engage with an online network (with respect to job listings). It is entirely possible for there to be a user who desires/needs a new job but has a low likelihood of future engagement (for example, if the user simply doesn't have the time to log into the online network very frequently, or isn't aware of the job search capabilities of the online network, etc.). By focusing solely on job seeker intent, rules-based approaches fail to capture these nuances. In other words, a rules-based job seeker score calculation provides accurate results for users who actively use the online network for job seeking, but not for those who do not.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
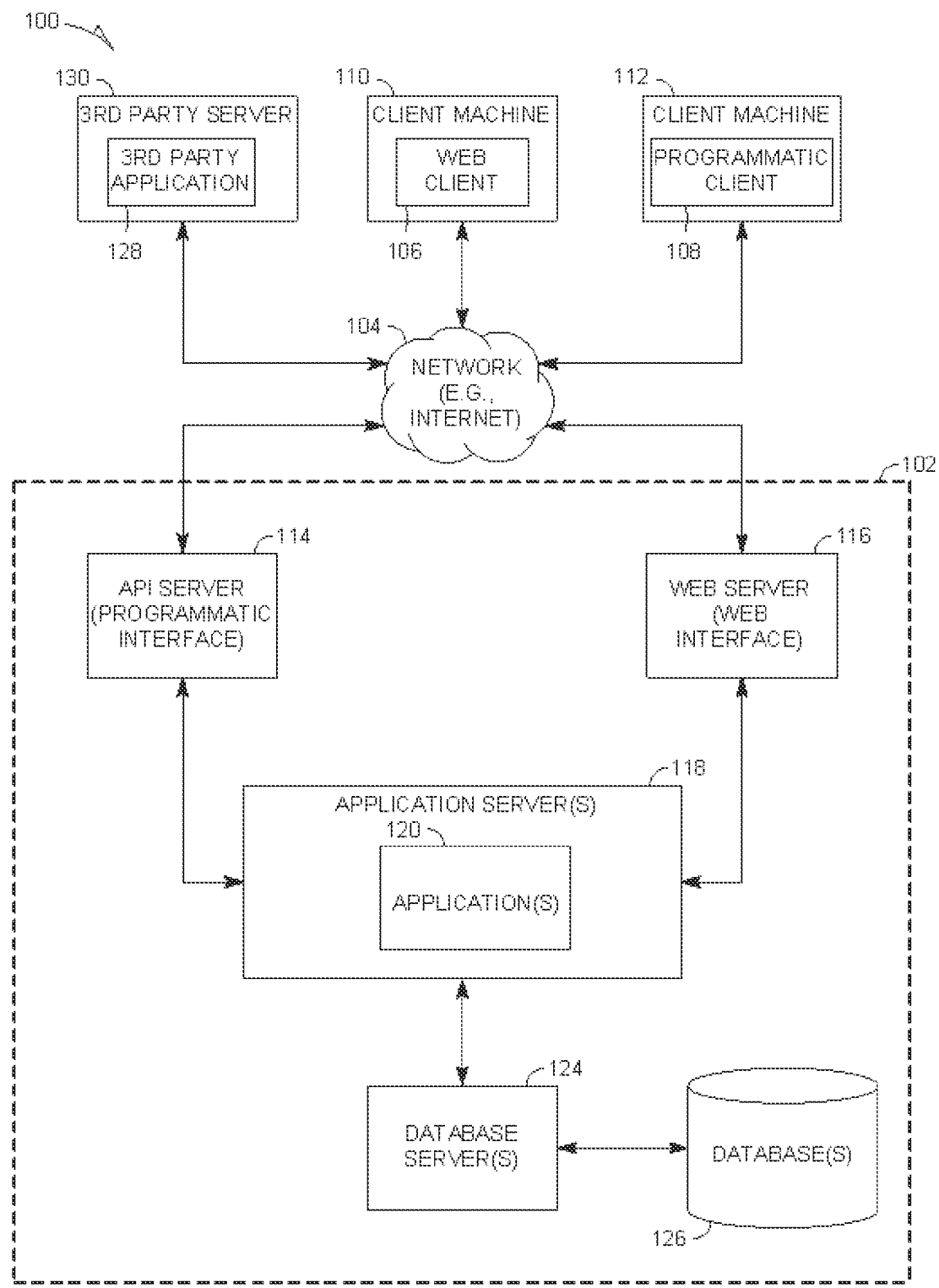
FIG. 1 is a block diagram illustrating a client-server system, in accordance with an example embodiment.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a specialized machine learned model, called a look-alike model, is trained using a machine learning algorithm to predict future job engagement for a user. This look-alike model is then used to create new segments on top of the segments provided by a rules-based approach. Specifically, the look-alike model is designed to take users who have been segmented by a rule-based approach into an "inactive job seeker" categorization (such as those assigned to the resting users and dormant users segments) and calculate a predicted job engagement score for these users. Based on the predicted job engagement score, a user may then be reassigned from one of the inactive job seeker categorizations to one of one or more new job seeker categorizations (such as predicted open job seekers or predicted opportunistic job seekers).

The specialized machine learned model is trained based on data from users in specific active job seeker segments, as opposed to all active job seeker segment. For example, in an example embodiment, the data for users in the open job seeker and opportunistic job seeker segments may be used for the training. As such, the specialized machine learned model is trained to identify traits of users that "look like" (i.e., are similar to) the traits of users in the training set. The result is that users who based on their own data might ordinarily have been assigned to an inactive job seeker segment are instead assigned to an active job seeker segment based on the fact that they are similar to users in the respective active job seeker segments.

DESCRIPTION

The disclosed embodiments provide a method, apparatus, and system for providing a machine learned model to predict future job engagement for a user in an online network. Future job engagement may be defined as interaction, by the user, with a graphical user interface of the online network, involving looking for, applying to, or otherwise engaging with posted job openings listed in the online network. In one specific example embodiment, job engagement involves job applies, job views, job home page view job search sessions, and a ratio of views to applies. The machine learned model may output a job engagement score based on its prediction for each of these types of job engagement metrics, and specifically a combination of these metrics, with each metric assigned a weight.

The prediction is also based on a particular time window, such as one week. Thus, for example, the job engagement score output by the machine learned model is indicative of a prediction of the likelihood of the user engaging with the online network for job opening purposes within the next week.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
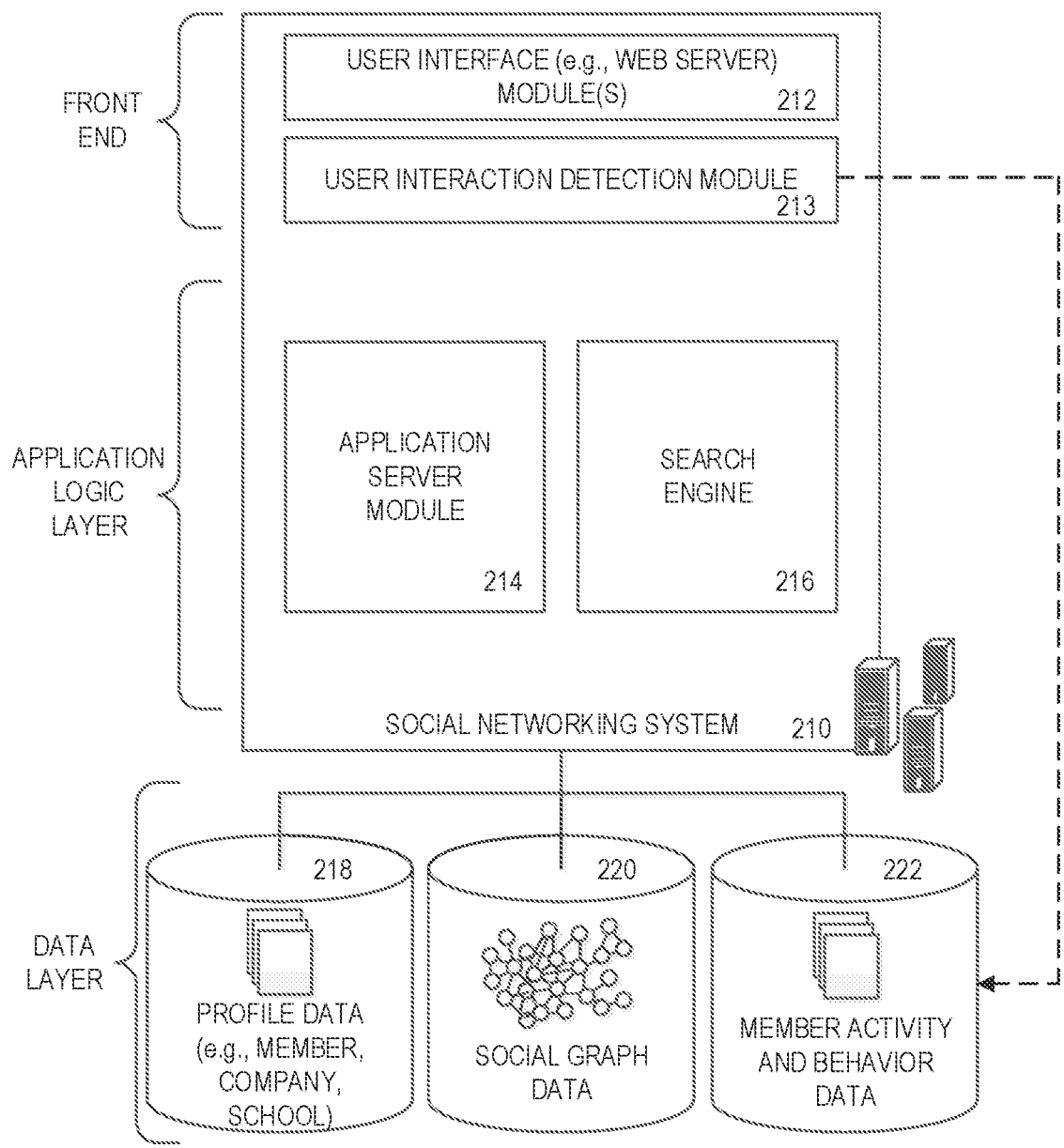
FIG. 2 is a block diagram showing the functional components of an online network, including a data processing module referred to herein as a search engine, for use in generating and providing search results for a search query, consistent with some embodiments of the present disclosure.

In some embodiments, the networked system 102 may comprise functional components of an online network. FIG. 2 is a block diagram showing the functional components of an online network, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices and communicates appropriate responses to the requesting client devices. For example, the user interface module(s) 212 may receive requests in the form of Hypertext Transfer Protocol (HTTP) requests or other web-based API requests. In addition, a user interaction detection module 213 may be provided to detect various interactions that users have with different applications 120, services, and content presented. As shown in FIG. 2, upon detecting a particular interaction, the user interaction detection module 213 logs the interaction, including the type of interaction and any metadata relating to the interaction, in a user activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the online network.

As shown in FIG. 2, the data layer may include several databases 126, such as a profile database 218 for storing profile data, including both user profile data and profile data for various organizations (e.g., companies, schools, etc.). Consistent with some embodiments, when a person initially registers to become a user of the online network, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the online network, the representative may be prompted to provide certain information about the organization. This information may be stored, for example, in the profile database 218, or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the online network. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 220.

As users interact with the various applications 120, services, and content made available via the online network, the users' interactions and behavior (e.g., content viewed, links or buttons selected, messages responded to, etc.) may be tracked, and information concerning the users' activities and behavior may be logged or stored, for example, as indicated in FIG. 2, by the user activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, a social networking system 210 provides an API module via which applications 120 and services can access various data and services provided or maintained by the online network. For example, using an API, an application may be able to request and/or receive one or more recommendations. Such applications 120 may be browser-based applications 120 or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the online network, nothing other than data privacy concerns prevents the API from being provided to the public or to certain third parties under special arrangements, thereby making the navigation recommendations available to third-party applications 128 and services.

Although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 216 facilitates the indexing and searching for content within the online network, such as the indexing and searching for data or information contained in the data layer, such as profile data (stored, e.g., in the profile database 218), social graph data (stored, e.g., in the social graph database 220), and user activity and behavior data (stored, e.g., in the user activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
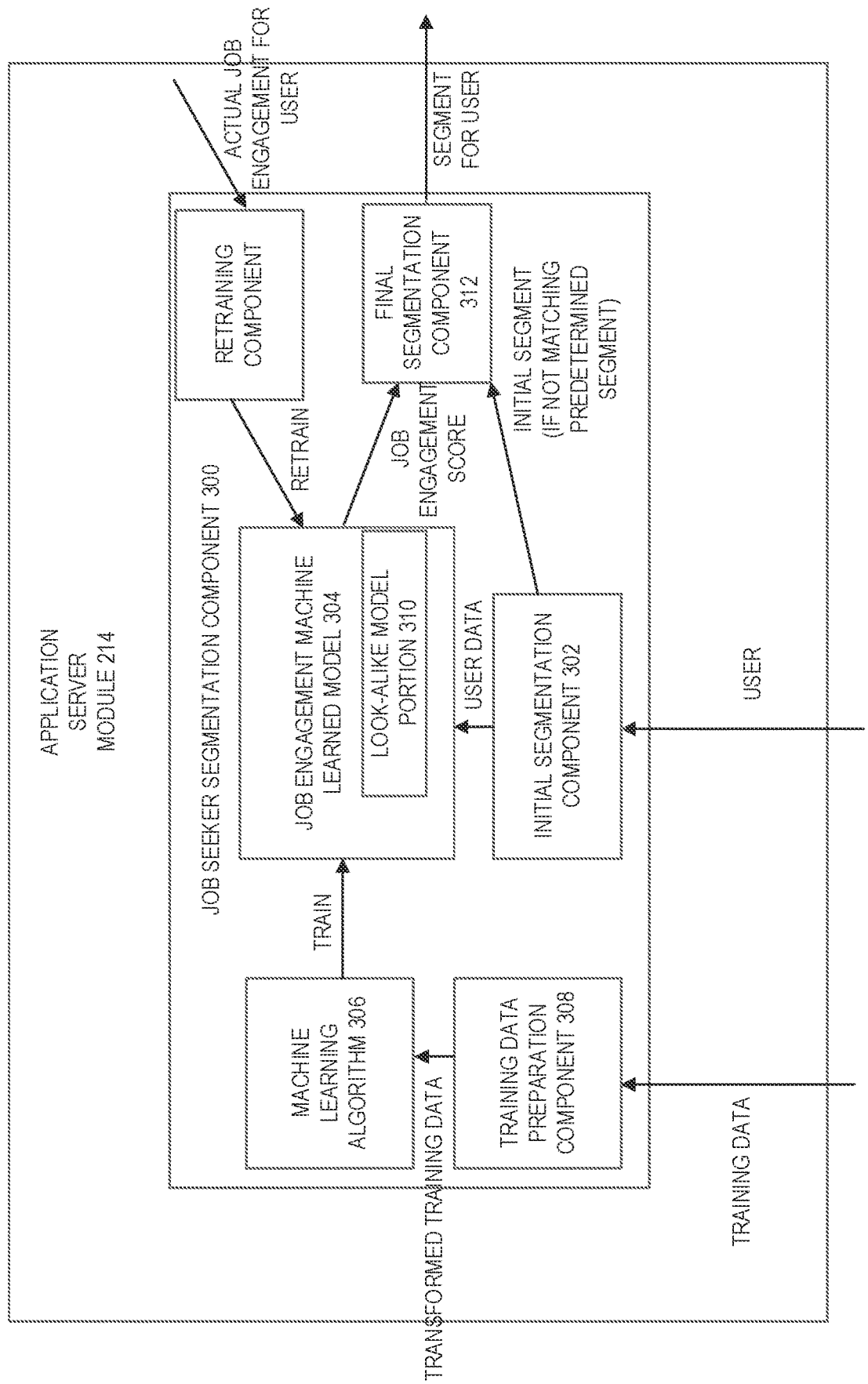
FIG. 3 is a block diagram illustrating application server module of FIG. 2 in more detail, in accordance with an example embodiment.

FIG. 3 is a block diagram illustrating application server module 214 of FIG. 2 in more detail, in accordance with an example embodiment. While in many embodiments the application server module 214 will contain many subcomponents used to perform various different actions within the social networking system 210, in FIG. 3 only those components that are relevant to the present disclosure are depicted.

A job seeker segmentation component 300 acts to segment users into one of various segments based on predicted online indications of engagement with job-related services of an online network. There may be many different ways to segment such users. In an example embodiment, these segments include: 1. Urgent Job Seekers (indicative of users who need a job), 2. Open Job Seekers (indicative of users who want a job but don't need a job), 3. Opportunistic Job Seekers (casual job seekers, indicative of users who would take the right job but don't necessarily want or need a new job, 4. Predicted Open Job Seekers (users whose own data isn't indicative of wanting a job but not needing a job, but who are look-alikes for users whose data is indicative of that) 5. Predicted Opportunistic Job Seekers (users whose own data isn't indicative of being opportunistic with regards to job seeking, but who are look-alikes for users whose data is indicative of that) 6. Resting Users (users not looking for a job, but who still engage with the online network in other ways), and 7. Dormant Users (users who do not engage with the online network).

Thus, the job seeker segmentation component 300 takes an input user and outputs a segment for the user, selected from the available segments, such as the seven described above.

The job seeker segmentation component 300 contains an initial segmentation component 302 that uses usage data for the input user to determine an initial segment for the user. This initial segment is selected only from a subset of the available segments. Specifically, in an example embodiment, this initial segment is selected only from Urgent Job Seekers (indicative of users who need a job), Open Job Seekers (indicative of users who want a job but don't need a job), Opportunistic Job Seekers (casual job seekers, indicative of users who would take the right job but don't necessarily want or need a new job, Resting Users (users not looking for a job, but who still engage with the online network in other ways), and Dormant Users (users who do not engage with the online network).

In an example embodiment, the initial segmentation component 302 determines the initial segment for a user based on the interactions the user performed with job-related content in the online network. These interactions may include, for example, applications for jobs, job searches, and views of job listings in the online network. The initial segmentation component 302 may utilize a rules-based approach in making this determination, with each segment having its own rule as to types and frequency of interactions that cause a corresponding user to be classified into the segment. For example, a user may be classified as an urgent job seeker if the user has applied to or saved one job in the past month. A user may be classified as an open job seeker is they have performed any interactions with job-related content in the past month. A user may be classified as an opportunistic job seeker if they have performed any interactions with job-related content in the past 3 months. A user may be classified as a resting user if they have performed no interactions with job-related content in the past 3 months but has performed other activities on the online network. A user may be classified as a formant user if they have performed no activities on the online network in the past 3 months.

Based on the initial segment for the user, a job engagement machine learned model 304 then may or may not compute a job engagement score for the user. As described above, this job engagement score is a prediction of the likelihood of the user engaging with the online network for job opening purposes within a given time frame (e.g., one week). In an example embodiment, the job engagement machine learned model 304 only computes the job engagement score for the user if the initial segment is one of Resting Users (users not looking for a job, but who still engage with the online network in other ways), and Dormant Users (users who do not engage with the online network). The job engagement machine learned model is only applied to these two segments due to the risk of miscalculation of a user segment if performed on the active job seeker segments. Specifically, since the calculated job seeker score can be used in applications such as candidate ranking (where users are presented to employers/recruiters in an order reflective of the users' likelihood of being a good candidate to contact for potential application for a job posting), there is a danger of accidentally misclassifying an otherwise active job seeker as an inactive job seeker based on the user's similarity to other users who are inactive job seeker. This can cause a bias in the ranking against users who match some general description of users who typically don't seek jobs in the online network. The danger of that occurring is quite great in that certain types of users may not be contacted for potential job postings. Such a danger does not really exist in the other direction—there is simply not as great a harm in a user being contacted for a job opening when they are not interested in seeking a new job than there is in a user being not contacted for a job opening when they are interested in seeking a new job.

The job engagement machine learned model 304 is learned via training using a machine learning algorithm 306. A training data preparation component 308 obtains training data from one or more databases and performs one or more transformations on the training data in order to prepare it for use as training data. These databases may include, for example, profile database 218, social graph database 220, and/or user activity and behavior database 222, among others, such as a jobs database (not pictured).

The transformations may include, for example, the computation of various metrics or scores based on the raw data from the databases. The result is a set of transformed training data. In an example embodiment, the transformed training data may include user attributes (such as location, skills, levels of skills, etc.), overall online network engagement across multiple users (such as home page views, unique users etc.), job seeking engagement (such as jobs home page views, total job views, total job applies, etc.), and derived job seeking metrics (such as a view-to-apply ratio (the ratio of job views to job applies), jobs unique users proportion (proportion of the engagements that are from unique users), etc.) Some of this training data may be limited to certain time windows. For example, the job seeking engagement may be limited to only engagements performed within the last four weeks. In an example embodiment, the machine learning algorithm 306 may use the transformed training data to train a look-alike model portion 310 of the job engagement machine learned model 304. The transformed training data used for this purpose may be limited to just the transformed training data for users who have been segmented into particular active job seeker segments, such as the open job seeker segment and the opportunistic job seeker segment. As such, the look-alike model portion 310 is trained to identify users who "look-alike" users in the particular active job seeker segment. For purposes of this disclosure, the particular active job seeker segments whose assignment may be re-assigned can be defined as "variable" segments, while the segments whose assignments may not be re-assigned can be defined as "fixed" segments.

In an example embodiment, the look-alike model portion 310 is an XGBoost model trained by an XGBoost machine learning algorithm. Nevertheless, in other example embodiments the machine learning algorithm may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method.

The training may involve learning one or more weights for input features present in the training data (with those features also being present in data for the input user at evaluation time).

The remainder of the job engagement machine learned model 304 is trained to output an actual job engagement score based on the output of the look-alike model portion 306. In other words, the look-alike model portion 306 outputs an indication of how much the user looks like users in the particular active job seeker segments and the job engagement machine learned model 304 uses this information, and potentially other information as well, to calculate an actual job engagement score for the user. In some example embodiments this remainder of the job engagement machine learned model 304 is not trained separately from the look-alike model portion 306 and both the job engagement machine learned model 304 as a whole and the look-alike model portion 306 are trained together using the same transformed training data and training techniques. Other example embodiments are possible, however, where the remainder of the job engagement machine learned model 304 is trained separately from the look-alike model portion 306, using different transformed training data and/or different training techniques.

The output of the job engagement machine learned model 304 is a job engagement score. This job engagement score may then be used by a final segmentation component 312 to assign a final segmentation to the user. In an example embodiment, since the job engagement machine learned model 304 is only used if the user is initially segmented into either the Resting Users or Dormant Users segment, the final segmentation will likewise only be performed for users initially segmented into one of these two groups. In other words, in an example embodiment, users initially classified into one of the active user segments (Urgent Job Seekers, Open Job Seekers, Opportunistic Job Seekers) will maintain their initially assigned segments, while users initially classified into one of the inactive user segments (Resting Users or Dormant Users) may be re-classified into a different final segment, based on their computed job engagement score.

In an example embodiment, one or more thresholds are used to determine whether to reclassify a user into a different final segment based on their computed job engagement score. For example, users with a job engagement score above a first threshold are segmented into a final segment of predicted open job seekers, users with a job engagement score between the first threshold and a second threshold are segmented into a final segment of predicted opportunistic job seekers, and users with a job engagement score below the second threshold are not reassigned and their initial segment is maintained. This is depicted in Table 1 below.

TABLE 1

| Initial Segment | Compute Job Seeker Score | Comparison with threshold | Final Segment |
|---|---|---|---|
| Dormant User | Y | Score > first threshold | Predicted open job seeker |
| Dormant User | Y | Second threshold > Score > first threshold | Predicted opportunistic job seeker |
| Dormant User | Y | Score < second threshold | Dormant User |
| Resting User | Y | Score > first threshold | Predicted open job seeker |
| Resting User | Y | Second threshold > Score > first threshold | Predicted opportunistic job seeker |
| Resting User | Y | Score < second threshold | Resting User |
| Opportunistic Job Seeker | N | N/A | Opportunistic Job Seeker |
| Open Job Seeker | N | N/A | Open Job Seeker |
| Urgent Job Seeker | N | N/A | Urgent Job Seeker |

In some example embodiments, users in the Dormant Users segment are excluded from the job engagement scoring and final segmentation, and thus it is only performed on users having an initial segment of Resting Users.

A retraining component 314 may then, at a later time, retrain the job engagement machine learned model 304. This retraining may be based on additional or new training data being received and/or may be based on analysis of the performance of the job engagement machine learned model 304, as expressed by usage data for users who have been segmented using the job engagement machine learned model 304. In the latter case, for example, if a user was assigned a final segment of predicted open job seeker but then subsequent usage data for the user indicates that the user did not actually engage with the online network for job seeking behavior during the week following the final segmentation, this information may be used as negative feedback by the retraining component 314, which may then change the job engagement machine learned model 304 to attempt to provide more accurate predictions in the future for the user or users like that user. This retraining may involve dynamically modifying the weights assigned to the features of the training data that were initially learned using the machine learning algorithm 306.

Figure 4:
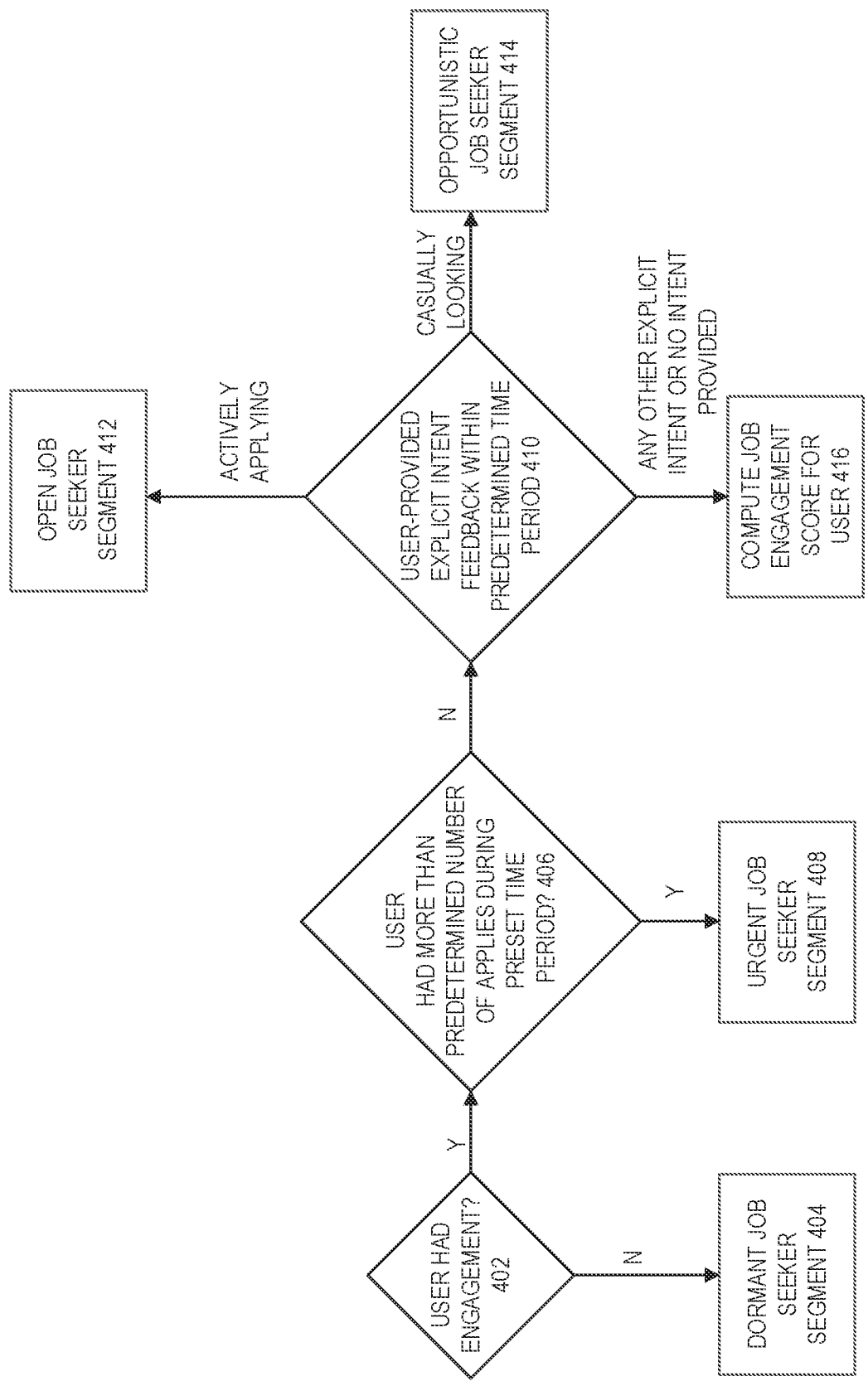
FIG. 4 is a flow diagram illustrating initial and final segmentation procedures 400, in accordance with an example embodiment.

FIG. 4 is a flow diagram illustrating initial and final segmentation procedures 400, in accordance with an example embodiment. These procedures 400 may be performed for each of one or more users of an online network. At operation 402, it is determined if the user has any engagement with the online network within a preset time period (e.g., within the prior 4 weeks). If not, then an initial segment of dormant job seeker 404 is assigned to the user. If so, then at operation 406, it is determined if the user has had more than a predetermined number of job applies (e.g., more than 28) in the online network during the preset time period. If so, then an initial segment of urgent job seeker 408 is assigned to the user.

If not, then at operation 410 it is determined if the user has provided an explicit intent feedback within a predetermined time period (e.g., within the prior 16 weeks). This explicit intent feedback may be provided in many different ways. In an example embodiment, the user is presented with various options to select a level of job seeking intent in marketing surveys and on a Jobs Home Page. These options may include buttons for "actively applying," "casually looking," "not looking, but open to offers," and "not open to offers".

If the user selected actively applying, then they are assigned the initial segment of open job seeker 412. If the user selected casually looking, then then they are assigned the initial segment of opportunistic job seeker 414. Any other answers (or no answer) move the procedures to operation 416, where a job engagement score is computed for the user, using the job engagement machine learned model 304.

Figure 5:
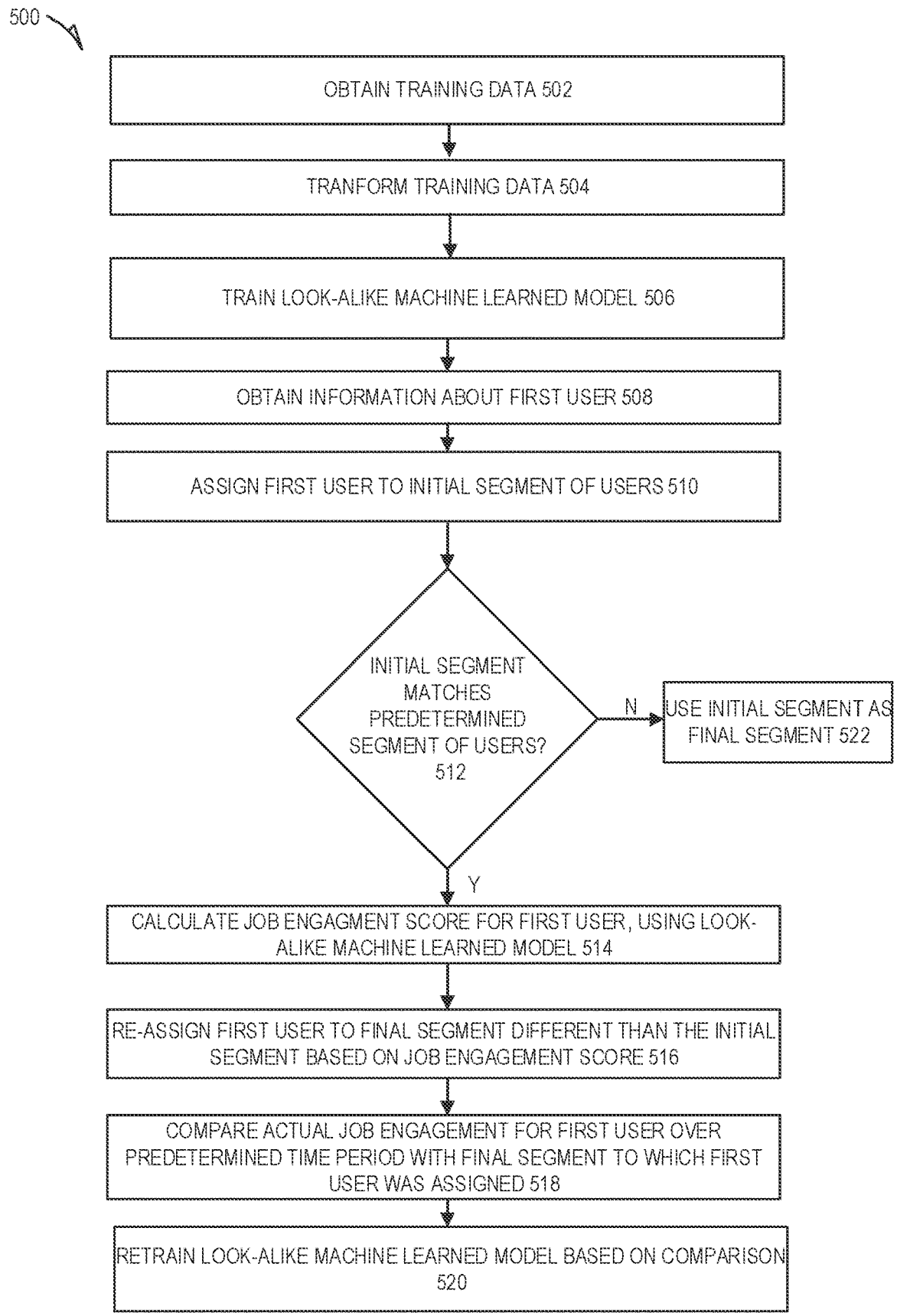
FIG. 5 is a flow diagram illustrating a method 500 for training and using a machine learned model in accordance with an example embodiment.

FIG. 5 is a flow diagram illustrating a method 500 for training and using a machine learned model in accordance with an example embodiment. At operation 502, training data is obtained. The training data includes data from one or more user profiles in an online network and corresponding job engagement data. The job engagement data includes information about interactions, via a graphical user interface of the online network, between corresponding users and job-related content in the online network. These interactions may include, for example, applications for jobs, job searches, and views of job listings in the online network. The training data may additionally include engagement data regarding engagement with the online network generally.

At operation 504, the training data is transformed. This may include calculating one or more metrics on the training data and including the calculated metrics in the transformed training data.

At operation 506, a look-alike machine learned model is trained, with a machine learning algorithm, using the transformed training data. This look-alike machine learned model is trained to cause the look-alike machine learned model to take information about a user and calculate a job engagement score for the user, the job engagement score being indicative of a prediction of future interactions, via the graphical user interface of the online network, between the user and job-related content in the online network, within a predetermined future time period.

Once the look-alike model is trained, it may be used in an evaluation phase to calculate job engagement scores for certain users. At operation 508, information is obtained about a first user. At operation 510, the first user is assigned to an initial segment of users based on the information about the first user. The initial segment is one of a plurality of segments of users, and this assignment may be at least partially based on job engagement of the first user within a predetermined past time period.

At operation 512, it may be determined the initial segment of users matches a predetermined segment of users on which re-assignment to a different segment should be attempted. In an example embodiment, the predetermined segment of users is one in which users in the predetermined segment are considered to be inactive job seekers based on their prior job engagement, such as the Resting Users job segment.

If at operation 512 it is determined that the initial segment of users matches the predetermined segment, at operation 514 a job engagement score is calculated for the first user by passing the information about the first user to the look-alike machine learned model. This means that users in other segments than the predetermined segment will not have the job engagement score calculated for them, or at least will not be reassigned to a different segment based on the job engagement score if it is calculated.

At operation 516, the first user is re-assigned to a final segment of users different than the initial segment of users, based on the calculated job engagement score for the first user. At operation 518, actual job engagement of the first user over the predetermined time period is compared with the final segment of users to which the first user was assigned. At operation 520, based on the comparison, the look-alike machine learned model is retrained.

If at operation 512 it was determined that the initial segment did not match the predetermined segment, then at operation 522 the initial segment is used as the final segment.

Figure 6:
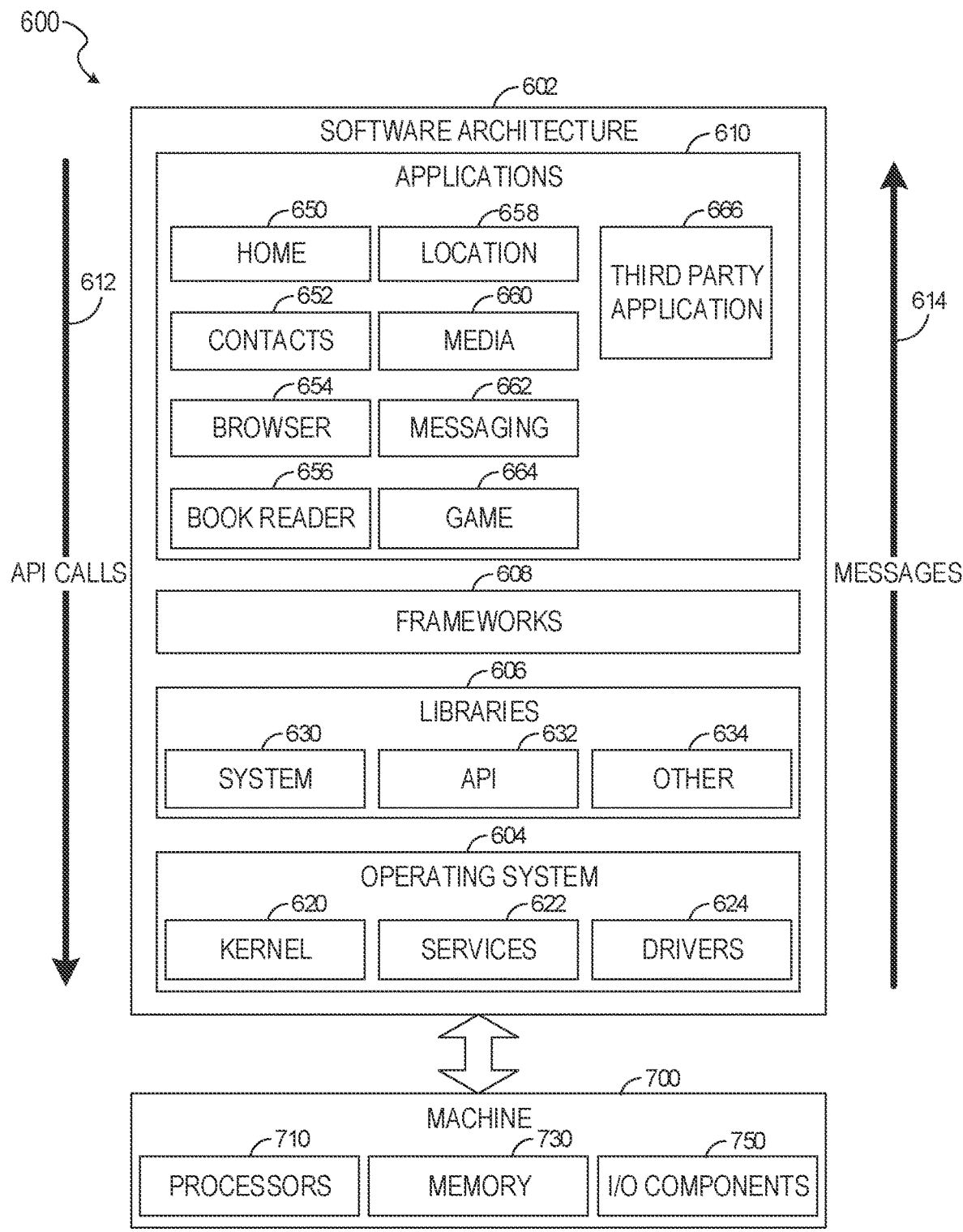
FIG. 6 is a block diagram illustrating a software architecture, in accordance with an example embodiment.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various GUI functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
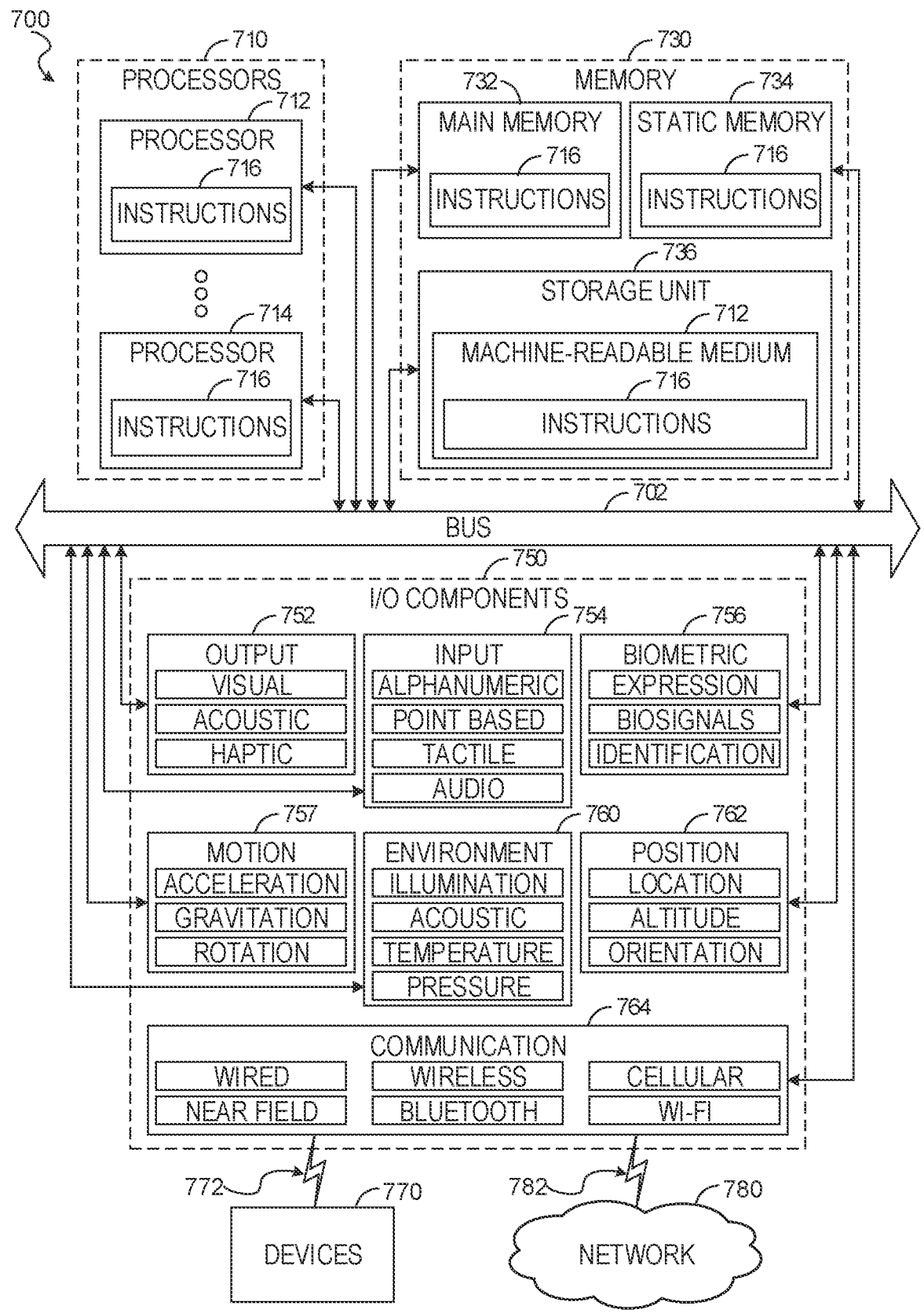
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein may be executed. For example, the instructions 716 may cause the machine 700 to execute the method 500 of FIG. 5. Additionally, or alternatively, the instructions 716 may implement FIGS. 1-5, and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors 712 (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor), multiple processors 710 with a single core, multiple processors 710 with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine 700 will depend on the type of machine 700. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to the processors 710. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system for training and using a machine learned model, comprising:
 a processor;
 a memory storing instructions, when executed by the processor, implement:
 a training data preparation component configured to obtain training data, the training data including data from one or more user profiles in an online network and corresponding job engagement data, the job engagement data including information about interactions, via a graphical user interface of the online network, between corresponding users and job-related content in the online network, and to transform the training data;
 a machine learning algorithm configured to train a look-alike machine learned model using the transformed training data, to cause the look-alike machine learned model to take information about a user and calculate a job engagement score for the user, the job engagement score being a prediction of future interactions, and via the graphical user interface of the online network, between the user and job-related content in the online network, within a predetermined time period;
 an initial segmentation component configured to obtain information about a first user, assign the first user to an initial segment of users based on the information about the first user, the initial segment being one of a plurality of segments of users, determine whether the initial segment of users matches a segment of users defined as a variable segment, and, in response to a determination that the initial segment matches the segment of users defined as a variable segment, cause the look-alike machine learned model to calculate a job engagement score for the first user by passing the information about the first user to the look-alike machine learned model;
 a final segmentation component configured to, prior to presenting content to the first user based on the assignment of the first user to an initial segment, re-assign the first user to a final segment of users different than the initial segment of users, based on the calculated job engagement score for the first user;
 a retraining component configured to compare actual job engagement of the first user over the predetermined time period with the final segment of users to which the first user was assigned, and retrain the look-alike machine learned model based on the comparison.

2. The system of claim 1, wherein the interactions include applications for jobs in the online network.

3. The system of claim 1, wherein the interactions include job searches in the online network.

4. The system of claim 1, wherein the interactions include views of job listings in the online network.

5. The system of claim 1, wherein the training data additionally includes engagement data regarding engagement with the online network generally.

6. The system of claim 1, wherein the transforming includes calculating one or more metrics on the training data and including the one or more metrics in the transformed training data.

7. The system of claim 1, wherein the machine learning algorithm is an XGBoost machine learning algorithm.

8. The system of claim 1, wherein the machine learning algorithm is a neural network.

9. The system of claim 1, wherein the training includes learning a weight for each of one or more features of the transformed training data.

10. A computerized method comprising:
 obtaining, by a processor, training data including data from one or more user profiles in an online network and corresponding job engagement data, the job engagement data including information about interactions, via a graphical user interface of the online network, between corresponding users and job-related content in the online network;
 transforming the training data;
 training a look-alike machine learned model, with a machine learning algorithm, using the transformed training data, to cause the look-alike machine learned model to take information about a user and calculate a job engagement score for the user, the job engagement score being indicative of a prediction of future interactions, via the graphical user interface of the online network, between the user and job-related content in the online network, within a predetermined time period;
 obtaining information about a first user;
 assigning the first user to an initial segment of users based on the information about the first user, the initial segment being one of a plurality of segments of users;
 determining whether the initial segment of users matches a segment of users defined as a variable segment;
 in response to a determination that the initial segment matches the segment of users defined as a variable segment, calculating a job engagement score for the first user by passing the information about the first user to the look-alike machine learned model;
 prior to presenting content to the first user based on the assignment of the first user to an initial segment, re-assigning the first user to a final segment of users different than the initial segment of users, based on the calculated job engagement score for the first user;
 comparing actual job engagement of the first user over the predetermined time period with the final segment of users to which the first user was assigned; and
 retraining the look-alike machine learned model based on the comparison.

11. The method of claim 10, wherein the interactions include applications for jobs in the online network.

12. The method of claim 10, wherein the interactions include job searches in the online network.

13. The method of claim 10, wherein the interactions include views of job listings in the online network.

14. The method of claim 10, wherein the training data additionally includes engagement data regarding engagement with the online network generally.

15. The method of claim 10, wherein the transforming includes calculating one or more metrics on the training data and including the one or more metrics in the transformed training data.

16. The method of claim 10, wherein the machine learning algorithm is an XGBoost machine learning algorithm.

17. The method of claim 10, wherein the machine learning algorithm is a neural network.

18. A non-transitory machine-readable storage medium comprising instructions which, when implemented by one or more machines, cause the one or more machines to perform operations comprising:

obtaining training data, the training data including data from one or more user profiles in an online network and corresponding job engagement data, the job engagement data including information about interactions, via a graphical user interface of the online network, between corresponding users and job-related content in the online network;

transforming the training data;

training a look-alike machine learned model, with a machine learning algorithm, using the transformed training data, to cause the look-alike machine learned model to take information about a user and calculate a job engagement score for the user, the job engagement score being indicative of a prediction of future interactions, via the graphical user interface of the online network, between the user and job-related content in the online network, within a predetermined time period;

obtaining information about a first user;

assigning the first user to an initial segment of users based on the information about the first user, the initial segment being one of a plurality of segments of users;

determining whether the initial segment of users matches segment of users defined as a variable segment;

in response to a determination that the initial segment matches the segment of users defined as a variable segment, calculating a job engagement score for the first user by passing the information about the first user to the look-alike machine learned model;

prior to presenting content to the first user based on the assignment of the first user to an initial segment, re-assigning the first user to a final segment of users different than the initial segment of users, based on the calculated job engagement score for the first user;

comparing actual job engagement of the first user over the predetermined time period with the final segment of users to which the first user was assigned; and retraining the look-alike machine learned model based on the comparison.

19. The non-transitory machine-readable storage medium of claim 18, wherein the operations further comprise:

determining whether the initial segment of users matches a predetermined segment of users on which re-assignment to a different segment should be attempted;

in response to a determination that the initial segment matches the predetermined segment, calculating a job engagement score for the first user by passing the information about the first user to the look-alike machine learned model; and re-assigning the first user to a final segment of users different than the initial segment of users, based on the calculated job engagement score for the first user.

* * * * *